US006029445A

United States Patent [19]

Lech

[11] Patent Number: 6,029,445

[45] Date of Patent: Feb. 29, 2000

[54] VARIABLE FLOW HYDRAULIC SYSTEM

[75] Inventor: Richard J. Lech, Burlington, Iowa

[73] Assignee: Case Corporation, Racine, Wis.

[21] Appl. No.: 09/233,876

[22] Filed: Jan. 20, 1999

[51] Int. Cl.[7] ........ F16D 31/02

[52] U.S. Cl. ........ 60/422; 60/453; 60/456; 60/494

[58] Field of Search ........ 60/421, 422, 453, 60/456, 493, 494, 468

[56] References Cited

U.S. PATENT DOCUMENTS

| | | | |
|---|---|---|---|
| 3,962,870 | 6/1976 | Lech . | |
| 3,985,472 | 10/1976 | Virtue et al. . | |
| 4,004,418 | 1/1977 | VanGerpen | 60/422 |
| 4,050,478 | 9/1977 | Virtue et al. . | |
| 4,420,934 | 12/1983 | Udono | 60/422 |
| 4,622,803 | 11/1986 | Lech . | |
| 4,712,376 | 12/1987 | Hadank et al. . | |
| 5,398,594 | 3/1995 | Tischer et al. | 60/422 X |
| 5,413,452 | 5/1995 | Lech et al. . | |
| 5,456,077 | 10/1995 | Bartlett | 60/422 |
| 5,471,908 | 12/1995 | Lech . | |
| 5,857,331 | 1/1999 | Chrsitensen et al. | 60/422 X |

*Primary Examiner*—Hoang Nguyen
*Attorney, Agent, or Firm*—Foley & Lardner

[57] ABSTRACT

A variable flow hydraulic system including a fixed displacement pump and a variable displacement pump for supplying pressurized hydraulic fluid in a machine is disclosed herein. Along with the dual pumps, the system includes a reservoir, a flow sensitive unloading valve, and a conduit system for distributing fluid flow between the system components. The reservoir stores fluid for use in a work circuit with an actuator for performing work in response to applied fluid flow. The fixed and variable displacement pumps are driven by a power source (e.g., an engine) to provide a fixed and a variable fluid flow, respectively. The variable flow is applied to the work circuit. As for the fixed flow, the unloading valve switches the fixed flow to either bypass or be applied to the work circuit in response to a flow signal, which depends upon the fluid flow being applied to the work circuit. The flow signal can be a differential pressure signal generated as the flow applied to the work circuit passes through a restriction in the conduit which supplies fluid flow to the work circuit. As the fixed flow is switched to and bypassed from the work circuit, the inherent flow compensation characteristics of the variable displacement pump provide for smooth, accurate, responsive and efficient machine operation.

21 Claims, 4 Drawing Sheets

VARIABLE FLOW HYDRAULIC SYSTEM

FIELD OF THE INVENTION

The invention relates generally to hydraulic fluid control systems. More particularly, the invention relates to an improved variable flow hydraulic system including a fixed displacement pump integrated with a variable displacement pump, wherein the variable pump output and the fixed pump output are combined using the inherent flow compensation characteristics of the variable displacement pump to provide for smooth, accurate, responsive and efficient machine operation.

BACKGROUND OF THE INVENTION

Hydraulic systems are used to supply pressurized hydraulic fluid to one or more fluid actuators in many types of machines including vehicles such as construction vehicles (e.g., loader/backhoes, skid-steers, forklifts, excavators, etc.), agricultural vehicles (e.g., tractors, combines, etc.) and other types of vehicles for performing work (e.g., over-the-road trucks, garbage trucks, etc.). Such hydraulic systems are also used to supply pressurized hydraulic fluid in stationary machines. For clarity, it is assumed below that the machine is a loader/backhoe construction vehicle similar to the 590 Super L model loader/backhoe vehicle made by Case Corp. of Wisconsin. The hydraulic system of the 590 Super L loader/backhoe currently uses two fixed displacement pumps having a displacement of over 5 cubic inches. However, the hydraulic system described herein may be used in other machines.

Existing machine hydraulic systems are typically produced in either of two forms: open center systems which use one or two fixed displacement pumps (typically gear pumps or vane pumps) that deliver flow in proportion to their speed (i.e., rpm) on a continuous basis; and closed center systems which use one or two variable displacement pumps to produce a variable flow on demand. The following paragraphs describe both types of systems, with the assumption that the machine is being operating at rated speed as recommended by most equipment manufacturers. According to industry custom, fixed displacement pumps are referred to below by the symbol PF and variable displacement pumps are referred to by the symbol PV.

The PF pump or pumps (e.g., gear pumps) used by open center or continuous flow hydraulic systems have the advantageous characteristics of being low cost and highly responsive. However, PF pumps are typically unreliable at high pressures and are inefficient at particular operating conditions such as during metering or at tool stall. For example, assume that the operator of a loader/backhoe vehicle equipped with a hydraulic system with a PF pump is attempting to precisely position the backhoe and is, therefore, using only a portion of the flow being output by the PF pump to move the given backhoe cylinder. The PF pump is consuming power equal to its total output flow and pressure required, even though the backhoe is using only a portion of that flow. The unused flow is converted to heat, and fuel is being consumed unnecessarily. The extreme situation occurs when the backhoe is stalled and the total flow is going over a relief valve and is, therefore, not doing any useful work. In this situation, the total flow from the PF pump is merely generating heat, and large volumes of fuel are being consumed with no work being performed. To reduce this wasteful pump operation, some hydraulic systems use multiple PF pumps called upon to deliver a required fluid volume or pressure depending on the operating or load condition. This solution, however, cannot always provide the correct fluid volume, and the PF pumps are still unreliable at high pressures.

The PV pump or pumps (e.g., piston pumps) used by closed center machine hydraulic systems produce a variable flow on demand. Thus, in standby conditions, such systems do not circulate hydraulic fluid. When such systems are equipped with flow and pressure control, the operator has the ability to direct the system to provide only a small volume of fluid to the work circuit which actuates the tool (e.g., the backhoe or loader), and the PV pump produces only the volume needed. When the tool stalls, the PV pump reduces its output flow to near zero, with corresponding reductions in the amounts of heat generated and fuel consumed.

Although hydraulic systems using only PV pumps have advantages in comparison to systems using only PF pumps, as described above, such systems also suffer from disadvantages as described below. A first problem of hydraulic systems using only PV pumps is the slow response of such systems. For example, assume the operator of a loader/backhoe vehicle wants to move or accelerate an attachment (e.g., bucket) quickly with the PV pump in stand-by condition (i.e., the de-stroked condition with no fluid being pumped). Since the PV pump is in stand-by when an instantaneous demand for fluid occurs, a finite time period is required for the pump to reach its full stroke where it will start pumping a large fluid volume. This finite period will result in hesitation (i.e., slow acceleration) of the tool, which is typically noticeable by the operator who expects and desires immediate tool movement. This situation occurs, in a more specific example, when a backhoe operator tries to shake out mud stuck in a bucket. In existing closed center systems, the slow response of PV pumps do not provide the instantaneous response needed to shake out the mud, and only a "mushy" shake will occur which may be insufficient to knock the mud out. In contrast, in conventional open-center hydraulic system, a control valve will be slammed open and closed to instantaneously start and stop fluid flow to the work circuit and a "hard" shake will occur which will be sufficient to knock the mud out.

A second problem of hydraulic systems using only PV pumps is the high cost of PV pumps in comparison to PF pumps of similar displacement volume. The cost of PV pumps is high due to the higher complexity and more moving parts required for PV pumps compared to PF pumps. In addition, the cost of the larger PV pumps required to accommodate applications requiring high displacements, such as most construction vehicle applications, increases disproportionately with size due to the relatively low volumes in which the larger displacement pumps are made and sold. Thus, to obtain an economical system, the hydraulic system must use the PV pumps sold in high volumes which are traditionally the smaller displacement pumps not suitable for the large-size applications such as those for construction vehicles.

A third problem of hydraulic systems using only PV pumps is the difficulty in obtaining a PV pump in the size needed for a particular application. In other words, since manufacturers do not make PV pumps having a wide variety of displacements, it can be difficult to obtain PV pumps with displacements customized to the particular application. Thus, for example, if a particular application requires a PV pump having a displacement of 5 cubic inches, it may be necessary to use a 6 cubic inch pump and then limit its stroke to 5 cubic inches. Custom-sizing does not pose a significant problem for PF pumps such as gear pumps since it is relatively easy for the manufacturer to shave the gear to obtain the desired displacement.

A fourth problem of hydraulic systems using only PV pumps involves durability issues which can arise when such systems are used for operating reciprocating devices such as hammers. When running a reciprocating tool, each operating cycle starts with a pressure spike and then a pressure drop, with relatively high fluid flow. If the pressure drops to zero, durability problems can occur due to problems associated with keeping the slippers located within the PV pumps in place.

A fifth problem of hydraulic systems using only PV pumps is the inability to filter or cool the system's hydraulic fluid under all operating conditions. Thus, for example, when the system is in stand-by or at stall, there is no fluid flow. With no flow, no fluid will pass through the system's filter and cooler components, and no filtering or cooling will occur. The lack of filtering and cooling will cause the hydraulic system to run hotter and dirtier, and can lead to reliability problems.

To solve some of the problems associated with pure PV or pure PF pump hydraulic systems, previous systems have combined PV and PF pumps along with a modulating unloading valve to unload the PF pump. Such prior hybrid dual pump systems, however, have been subject to problems such as jerky operation, the need for complex modulated unloading valves, and inefficiencies due to modulation. For example, due to the fast drop-off in flow after pressures reach a predetermined value which is typical of the output characteristics of PV pumps, such prior systems need to use a modulating valve for unloading the gear pump. However, from an efficiency viewpoint, it would be better to cut the flow from the gear pump in and out of the flow applied to the work circuit quickly. By modulating the pressure (i.e., bringing on or taking off the flow from the gear pump slowly), such previous systems waste horsepower since only part of the output flow from the gear pump is used, and the rest of the flow from the gear pump is wasted as heat. Thus, due to the need for modulation, such prior dual pump systems are inefficient and wasteful.

Thus, it would be advantageous to provide an improved variable flow hydraulic system including a PF pump integrated with a PV pump to provide for the performance and efficiency advantages of pure PV pump systems, while minimizing costs by using a PV pump of a size produced in high quantities with a low-cost PF pump. It would also be advantageous to provide such a hybrid dual pump hydraulic system wherein the output flows of the PF pump and the PV pump are combined using the inherent flow compensation characteristics of the PV pump to provide for smooth, accurate, responsive and efficient machine operation. Further, it would be advantageous to provide such a hybrid dual pump system which eliminates some or all of the above-described disadvantages of hydraulic systems using only PV pumps.

SUMMARY OF THE INVENTION

One embodiment of the invention provides a variable flow hydraulic system for supplying pressurized fluid in a machine. The machine has a power source for driving the hydraulic system and a work circuit having at least one fluid actuator for performing work in response to an applied hydraulic fluid flow. The hydraulic system includes a reservoir, fixed and variable displacement pumps, and a flow sensitive unloading valve. The reservoir stores hydraulic fluid for use in the work circuit. The fixed displacement pump has an inlet port and an outlet port, and is driven by the power source to provide a fixed flow of pressurized hydraulic fluid. The variable displacement pump has an inlet port, an outlet port, a de-stroking actuator, and a compensator for controlling the de-stroking actuator, and is driven by the power source to provide a variable flow of fluid to be applied to the work circuit. The unloading valve has an inlet valve port fluidly coupled to the outlet port of the fixed displacement pump, a first outlet valve port fluidly coupled to the reservoir which bypasses the work circuit, and a second outlet valve port fluidly coupled to the work circuit. The unloading valve is configured to discretely direct the fixed flow entering the inlet valve port to one of the first and the second outlet valve ports depending upon a flow signal applied to the unloading valve, wherein the flow signal depends on the fluid flow being applied to the work circuit.

Another embodiment of the invention also provides a variable flow hydraulic system for supplying pressurized fluid in a machine. The machine has a power source for driving the hydraulic system and a work circuit having at least one fluid actuator for performing work in response to an applied hydraulic fluid flow. The hydraulic system includes a reservoir, fixed and variable displacement pumps, a flow sensitive unloading valve, and a conduit system. The reservoir stores fluid for use in the work circuit. The fixed displacement pump has an inlet port and an outlet port, and is driven by the power source for providing a fixed flow of fluid. The variable displacement pump has an inlet port, an outlet port, a de-stroking actuator, and a compensator for controlling the de-stroking actuator, and is driven by the power source to provide a variable flow of fluid to be applied to the work circuit. The flow sensitive unloading valve has an inlet valve port, a first outlet valve port, and a second outlet valve port, and is configured to discretely switch fluid flow entering the inlet valve port between the first and second outlet valve ports based on a fluid signal applied to the unloading valve. The conduit system distributes flow between the reservoir, the fixed and variable displacement pumps, the unloading valve, and the work circuit, wherein the outlet port of the fixed displacement pump is fluidly coupled to the inlet valve port, the first outlet valve port bypasses the work circuit, the second outlet valve port is fluidly coupled to the work circuit, and the outlet port of the variable displacement pump is also fluidly coupled to the work circuit. The conduit system has a restriction for generating the fluid signal applied to the unloading valve in response to the fluid flow applied to the work circuit to discretely switch the fixed fluid flow from the fixed displacement pump between being applied to the work circuit and bypassing the work circuit.

Another embodiment of the invention provides a method of applying a variable flow of pressurized hydraulic fluid to a work circuit in a machine. The work circuit has at least one fluid actuator for performing work in response to the applied fluid flow. The method includes the steps of pumping a fixed fluid flow using a fixed displacement pump, pumping a variable fluid flow using a variable displacement pump, applying the variable fluid flow pumped by the variable displacement pump to the work circuit, generating a flow signal representative of first and second flow states based upon the fluid flow being applied to the work circuit, and bypassing the fixed fluid flow pumped by the fixed displacement pump around the work circuit when the flow signal is in the first state and directing the fixed fluid flow to the work circuit when the flow signal is in the second state.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
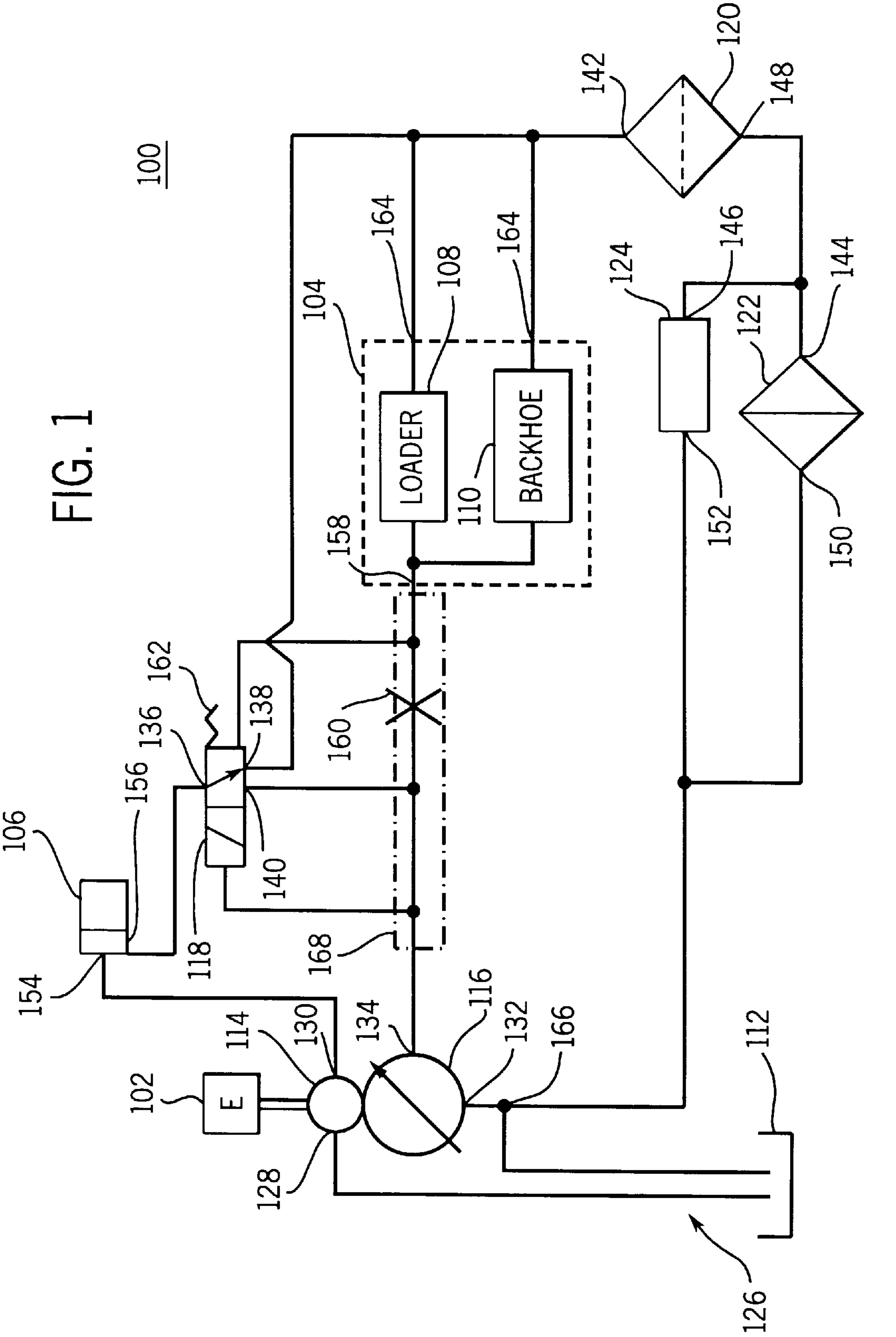
FIG. 1 is a schematic diagram of a variable flow hydraulic system for supplying pressurized fluid in a machine in accordance with the present invention.

Referring to FIG. 1, a variable flow hydraulic system 100 for supplying pressurized hydraulic fluid to a machine such as a construction vehicle (e.g., a loader/backhoe, skid-steer, forklift, excavator, etc.), agricultural vehicle (e.g., tractor, combine, etc.), other type of work vehicle (e.g., over-the-road truck, garbage truck, etc.), or other type of stationary or mobile machine is shown.

For the purposes of this description, it is assumed that the machine is a loader/backhoe vehicle similar to the 590 Super L loader/backhoe made by Case Corp. of Wisconsin except that the hydraulic system is replaced with hydraulic system 100. It is also assumed that, to satisfy the performance criteria for the machine, hydraulic system 100 must be capable of providing a maximum fluid flow rate of 47 gallons per minute (gpm) and a maximum pressure of 3800 pounds per square inch (psi). However, as is typical for construction equipment machines, the maximum flow and maximum pressure will not be required at the same time. The maximum pressure will be required at or near stall conditions (e.g., where a tool is being used to break material loose) where the flow to the attachment or tool (e.g., a bucket) will be low or zero, while the maximum flow will be required during large, rapid movements of the tool which will occur at lower pressures than the pressures which occur at stall conditions. It will be apparent, however, that these particular requirements are only illustrative, and that hydraulic system 100 may easily be adapted for use in many types of machines with different hydraulic system flow and pressure requirements.

The machine has components which interact with hydraulic system 100, such as a power source 102, a work circuit 104, and a steering cylinder 106. Source 102 provides power to drive hydraulic system 100 and includes, e.g., the vehicle's engine. Work circuit 104 has one or more fluid actuators for performing work in response to an applied flow. In the loader/backhoe machine, work circuit 104 includes a loader circuit 108 and a backhoe circuit 110. Loader circuit 108 has a valve or valve bank for applying fluid to one or more loader fluid actuators (e.g., hydraulic cylinders) which actuate the loader, and backhoe circuit 110 has a valve or valve bank for applying fluid to one or more backhoe actuators which actuate the backhoe. The operator controls movements of the loader or the backhoe using input devices (e.g., control handles) that affect loader and backhoe circuits 108 and 110 as is known in the art. While FIG. 1 shows work circuit 104 with circuits 108–110, other work circuits can be used such as a work circuit having only a loader circuit as for a wheel loader (e.g., a 921B wheel loader made by Case Corp.). Steering cylinder 106 is a conventional steering cylinder with priority for actuating the vehicle's steering mechanism, and typically requires only a relatively small amount of flow (e.g., 1–2 gpm). The rest of the fluid normally passing through steering cylinder 106 is typically wasted as heat by conventional hydraulic systems but, as described below, can be redirected by hydraulic system 100 to work circuit 104 in order to perform useful work under certain conditions. The interaction of machine components 102–110 with hydraulic system 100 is described in further detail below.

Hydraulic system 100 includes a reservoir 112, a fixed displacement (PF) pump 114, a variable displacement (PV) pump 116, a flow sensitive unloading valve 118, a filter 120, a cooler 122, a bypass valve 124, and a conduit system 126. Reservoir 112 stores hydraulic fluid used by hydraulic system 100 to transfer power from power source 102 to actuators of work circuit 104 and steering cylinder 106.

PF pump 114 has an inlet port 128 and an outlet port 130, and is driven by power source 102 to provide a fixed flow of pressurized hydraulic fluid. PV pump 116 has an inlet port 132, an outlet port 134, and a built-in de-stroking actuator along with a compensator for controlling the de-stroking actuator, and is also driven by power source 102 to provide a variable flow of pressurized fluid. Flow sensitive unloading valve 118 has an inlet valve port 136 and first and second outlet valve ports 138 and 140. Filter 120, cooler 122 and bypass valve 124 each has a respective inlet port 142, 144 and 146, and a respective outlet port 148, 150 and 152. Filter 120, cooler 122 and bypass 124, and their interconnections, are referred to collectively as a return circuit since they return fluid to reservoir 112.

Conduit system 126 is provided for distributing flow between the components of the machine and hydraulic system 100. For simplicity, system 126 is referred to simply by reference numeral 126, and the separate conduits used to fluidly connect component pairs, as described below, are not separately labeled.

Inlet port 128 of PF pump 114 is fluidly coupled to reservoir 112 to provide pump 114 with a source of hydraulic fluid. Outlet port 130 of pump 114 is fluidly coupled to an inlet port 154 of steering cylinder 106 to direct the fixed fluid flow from pump 114 to cylinder 106. An outlet port 156 of cylinder 106 is fluidly coupled to inlet valve port 136 of unloading valve 118 to pass the fixed flow not needed by cylinder 106 to valve 118. Alternatively, cylinder 106 can be omitted with little effect on the operation of system 100, except that the fixed flow from PF pump 114 would flow directly to valve 118 rather than flowing via cylinder 106.

First outlet valve port 138 of unloading valve 118 is fluidly coupled to the return circuit (in particular, to inlet port 142 of filter 120) to unload the fixed flow from pump 114 to the return circuit. Second outlet valve port 140 of valve 118 is fluidly coupled to one or more inlet ports 158 of work circuit 104 to allow valve 118 to redirect the fixed flow to work circuit 104 under certain conditions as described below. Thus, the fixed flow from PF pump 114 can be returned directly to reservoir 112 via the return circuit without passing through work circuit 104, or can be passed through circuit 104 to perform useful work before being returned.

Inlet port 132 of PV pump 116 is also fluidly coupled to reservoir 112 to provide pump 116 with a source of hydraulic fluid. Outlet port 134 of pump 116 is fluidly coupled first to second outlet valve port 140 of unloading valve 118 such that the variable flow from pump 116 is combined with any fixed flow from valve 118, and then to inlet port 158 of work circuit 104 such that work circuit 104 receives the combined flow. Thus, work circuit 104 receives only the variable flow from PV pump 116 when valve 118 is unloading PF pump 114, and receives both the fixed flow and the variable flow when PF pump 114 is not being unloaded.

Conduit system 126 provides a restriction 160 (e.g., an orifice) in the conduit which fluidly couples outlet port 134 of PV pump 116 (and second outlet valve port 140 of valve 118) to inlet port 158 of work circuit 104. Restriction 160 is located between the point where outlet port 134 and second outlet valve port 140 are connected, and the location of inlet port 158, so that the combined flow passes through restriction 160 before reaching inlet port 158. Conduit system 126 further provides a pair of flow-sensing conduits on either side of restriction 160 to provide a flow signal (i.e., a differential pressure) which is applied across valve 118.

Unloading valve 118 is configured to discretely direct or switch the flow entering inlet valve port 136 to one of first and second outlet valve ports 138 and 140 depending upon the flow signal, and is biased by a spring 162 to direct the inlet flow to first outlet valve port 138. When the PV flow passing through restriction 160 is small, the differential pressure generated across restriction 160, and applied to valve 118 by the flow-sensing conduits, is insufficient to overcome the bias of spring 162, and valve 118 directs the fixed flow from PF pump 114 to the return circuit (with work circuit 104 bypassed). In this situation, only variable flow from pump 116 passes through restriction 160 to be applied to circuit 104.

As the PV flow passing through restriction 160 increases, the differential pressure applied across valve 118 increases. When the PV flow reaches a predefined value, the differential pressure becomes sufficient to overcome the bias force of spring 162, and valve 118 snaps from a first state to a second state to redirect the fixed flow to second outlet valve port 140 to be combined with the variable flow. The combined flow passes through restriction 160 and to circuit 104, where the combined flow can perform useful work. As the fixed flow from pump 114 is cut into the flow provided to circuit 104, the inherent flow compensation characteristics of PV pump 116 cause that pump to pump correspondingly less flow such that the transition is not noticeable to the operator, as described further below.

Then, as the combined flow passing via restriction 160 decreases, the differential pressure applied across valve 118 decreases. When the combined flow drops below the predefined value, the differential pressure is no longer sufficient to overcome the bias force of spring 162, and valve 118 snaps back from the second to the first state to direct the fixed flow back to first outlet valve port 138 to the return circuit (bypassing work circuit 104). As the fixed flow from pump 114 is cut back out of the flow being provided to work circuit 104, the inherent flow compensation characteristics of PV pump 116 cause that pump to pump correspondingly more flow so the transition is not noticeable to the operator, as described further below.

Work circuit 104 has one or more outlet ports 164 fluidly coupled to the return circuit (in particular, to inlet port 142 of filter 120) to allow the fluid to return to reservoir 112 after being used by work circuit 104 to perform useful work.

After entering the return circuit at inlet port 142 of filter 120, the fluid return path back to reservoir 112 is as follows. Outlet port 148 of filter 120 is fluidly coupled in parallel to inlet ports 144 and 146 of cooler 122 and bypass valve 124, respectively, to direct the filtered fluid to cooler 122 and valve 124. Outlet ports 150 and 152 of cooler 122 and valve 124 are then fluidly coupled to reservoir 112. Cooler 122 cools the fluid, and valve 124 bypasses the fluid around cooler 122 if the differential pressure across cooler 122 indicates an obstruction. Filter 120, cooler 122 and valve 124 are conventional hydraulic circuit components.

In a preferred embodiment, conduit system 126 combines the return flow passing through outlet ports 150 and 152, and then passes the combined flow closely by inlet port 132 of PV pump 116 (e.g., at point 166) to provide a positive pressure charge at inlet port 132 before the return oil is dumped into reservoir 112. The positive pressure charge helps alleviate problems caused by the relatively poor vacuum capability of piston pumps in comparison to gear pumps. Upon start-up of hydraulic system 100, both the gear pump and piston pump must draw up oil from reservoir 112 before pumping can begin. This is especially difficult on a cold day when the oil is sluggish. Gear pumps generally have the vacuum capability needed to draw up the oil. However, the poor vacuum capability of piston pumps makes it difficult for the piston pump to draw up the oil. To address this problem, the return oil generated by the flow of the gear pump (which begins to pump fluid as soon as the vehicle's starter motor is turned on) is routed to discharge at the inlet port of the piston pump to pre-charge that pump. Since there will always be more oil returning to inlet port 132 of the piston pump (due to operation of the gear pump), and since the gear pump will provide a pressure sufficient to push the oil back to reservoir 112, a positive pressure charge will be created at inlet port 132 of the piston pump, which will overcome the piston pump's vacuum problem. This pre-charging feature of hydraulic system 100 will advantageously increase the life of PV pump 116, and will allow the piston pump to run quieter, without adding any significant costs.

Now that the interconnections between the various components of the machine and of hydraulic system 100 have been described, the following paragraphs further describe both the components and the operation of hydraulic system 100.

PF pump 114 is a fixed displacement pump driven by power source 102 for providing a fixed flow of pressurized hydraulic fluid which is routed to steering cylinder 106, unloading valve 118, and then either directly to the return circuit or to work circuit 104, depending upon the state of valve 118. PF pumps are typically gear or vane pumps that deliver flow in proportion to their speed (i.e., rpm) on a continuous basis. Since a machine such as the loader/backhoe described herein is typically operated at rated speed as recommended by its manufacturer, a PF pump provides a fixed flow. PF pumps such as gear pumps are commercially available at low cost and in a wide variety of displacements, and it is relatively easy for a manufacturer to shave the gear to provide a custom-sized displacement. PF pumps are made by many manufacturers including Commercial Intertech Corp. of Ohio, Sauer-Sundstrand GmbH & Co. of Germany, and Vickers, Inc. of Ohio. In the exemplary loader/backhoe application described herein, PF pump 114 is sized to provide a fixed fluid flow of approximately 15 gallons per minute (i.e., 15 gpm).

PV pump 116 is a variable displacement pump also driven by power source 102 for providing a variable flow of pressurized hydraulic fluid routed first to work circuit 104 and then to the return circuit. Alternatively, PV pump 116 can be driven by a second power source other than the power source which drives pump 114, or either or both pumps 114 and 116 can be driven by a power source other than the vehicle's engine such as an auxiliary engine or external power source. PV pumps are typically piston pumps which are designed to conserve horsepower and the heat associated with moving fluid which is not performing any useful work. Hydraulic system 100 is a load-sensing hydraulic system and PV pump 116 has a built-in de-stroking actuator and a compensator (or series of compensators) which control the de-stroking actuator. Piston pumps are made by manufacturers such as Sauer-Sundstrand, Rex Operating Valve Co. of Michigan, and Vickers. In the exemplary application described herein, pump 116 is sized to provide a maximum flow of 32 gpm. Thus, the total flow which can be provided to work circuit 104 by PF pump 114 and PV pump 116 is 47 gpm (when valve 118 directs the fixed flow to circuit 104) which equals the maximum flow rate requirement of hydraulic system 100.

Figure 2:
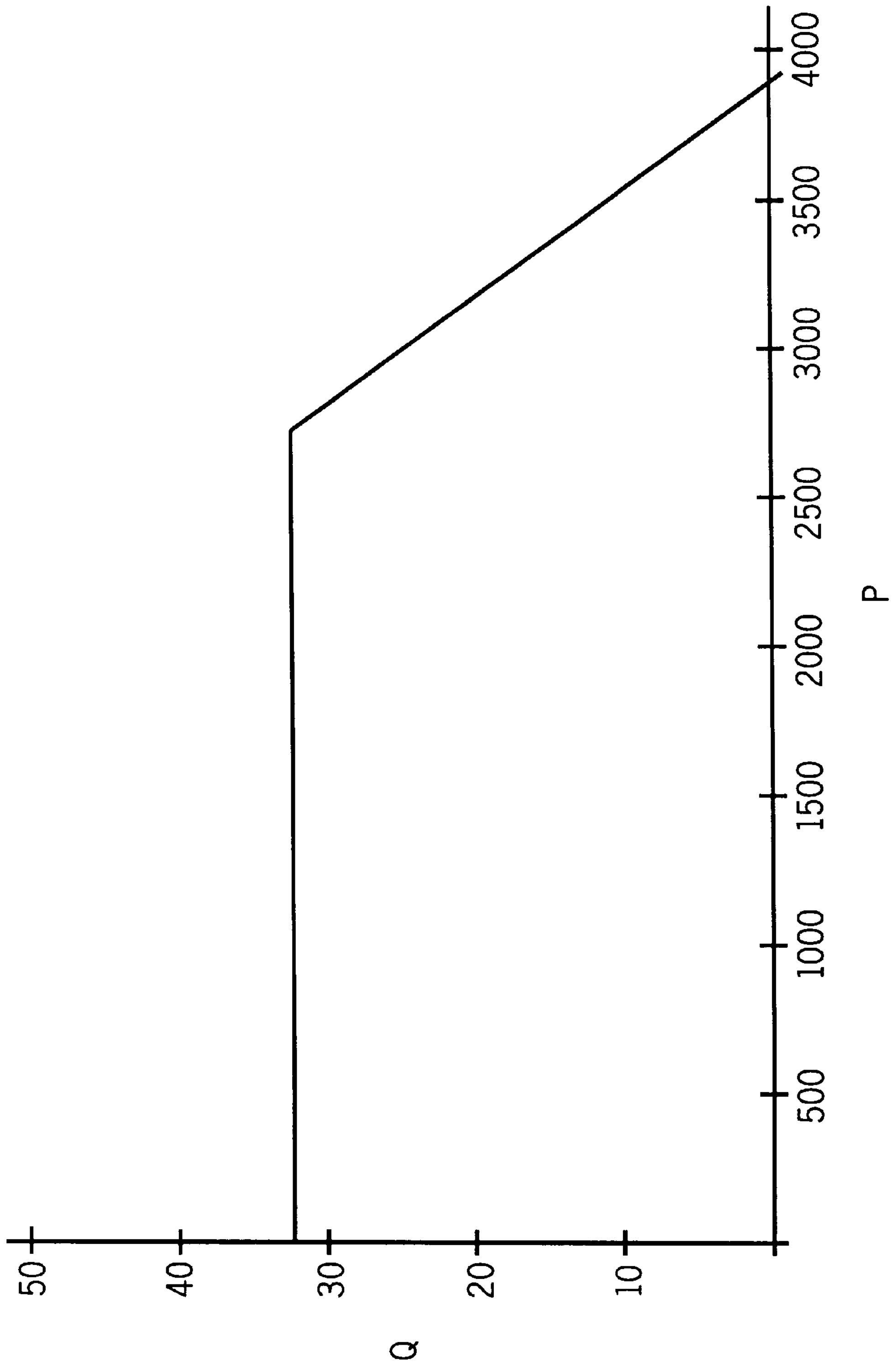
FIG. 2 is a graph showing the output characteristics of the variable displacement pump, which include a substantially full fluid flow until the pressure reaches a predetermined pressure at which point the fluid flow gradually drops off.

Referring to FIG. 2, the output characteristics of PV pump 116 are nearly the same as the characteristics of a standard PV pump with similar pressure and displacement specifications, except for one feature. As noted above, PV pump 116 is sized to provide a maximum flow of 32 gpm. This full flow is maintained as the pressure increases from zero until reaching a maximum of about 2700 psi. At this point, the flow gradually drops off with increasing pressure until the flow drops to zero at about 3800 psi. In contrast, the output characteristics of a standard PV pump capable of providing the same displacement of 32 gpm would be such that the flow would drop from its full flow of 32 gpm to zero flow quickly (e.g., within a pressure range of about 100 psi as compared to the range of about 1100 psi for PV pump 116). Thus, a standard pump may decrease its flow from 32 gpm to zero as the pressure increases from 3700 to 3800 psi. To modify a standard PV pump to have characteristics similar to those of FIG. 2, a small spool in the compensator of the pump is modified. The gradual drop-off in flow with increasing pressures gives enough room to unload the fixed flow from work circuit 104 during the drop-off.

The gradual drop-off in flow with increasing pressures of PV pump 116 provides another benefit to hydraulic system 100 by allowing better matching of horsepower usage. Assume, for example, that a standard piston pump (with output characteristics wherein flow drops off quickly with increasing pressures) is used in place of PV pump 116, and that this pump does not start to de-stroke and cut flow until a pressure of about 3700 psi (i.e., maintains its full flow until 3700 psi), and then de-strokes quickly to become completely de-stroked at 3800 psi. Then, the corner horsepower that the engine must be capable of providing, which equals the product of flow and pressure divided by 171, would be relatively high. Thus, the engine would need to be sized large enough to handle this corner (i.e., theoretical) horsepower requirement. By tailoring the compensator of PV pump 116 such that the pump cuts back on flow earlier (i.e., at about 2700 psi), and by cutting in the fixed flow from the gear pump, the machine can be equipped with a smaller engine, with advantages in terms of engine cost, weight, fuel consumption, etc. Therefore, to provide an increased level of efficiency, hydraulic system 100 takes advantage of the fact that while a machine may need both high pressure (e.g., when digging with a bucket), and may need high flow (e.g., when moving the bucket rapidly through the air), the machine will not need high pressure simultaneously with high flow.

Of course, while the use of a piston pump with a gradual drop-off in flow with increasing pressures above its maximum pressure is preferred, hydraulic system 100 can alternatively be configured with a standard piston pump while still retaining some or all of the advantages of hydraulic system 100 as described herein.

Flow sensitive unloading valve 118 is configured to direct the fixed flow received from PF pump 114 to either the return circuit or to work circuit 104 depending on the flow signal (i.e., the differential pressure) applied to valve 118, as sensed across restriction 160. Thus, valve 118 is actuated by differential pressure. Spring 162 biases valve 118 to direct the fixed flow to the return circuit. However, once the delta pressure across restriction 160 becomes large enough, the fixed flow is discretely redirected to work circuit 104 to perform useful work. Previous dual pump hydraulic circuits use a modulating unloading valve to maintain smooth flow, which is inefficient whenever modulation occurs. Valve 118, in contrast, is a snap-action valve which kicks in and kicks out, without modulating. To maintain smooth flow to work circuits 104 when the fixed flow is cut in and out, hydraulic system 100 instead uses the inherent flow compensation characteristics of PV pump 116. Typical unloading valves are available from Sauer-Sundstrand, Vickers and Ross and Sterling Hydraulics, Inc. of Illinois. For example, the M1A125 pressure unloading valve available from Sterling Hydraulics can be easily modified to create valve 118.

Restriction 160 in conduit system 126 is located between outlet port 134 of PV pump 116 (and second outlet valve port 140 of valve 118) and inlet port 158 of work circuit 104. Restriction 160 functions to create a differential pressure which forms the flow signal applied across valve 118. Restriction 160 may be an actual orifice which creates the differential pressure or could be a restriction formed in the conduit line itself. Restriction 160 is sized to provide a differential pressure across valve 118 corresponding to a predetermined flow rate (between 22–23 gpm in the exemplary system). Alternatively, the flow sensing location of restriction 160 can be moved to any location wherein the flow is representative of the flow applied to work circuit 104. Thus, the restriction or orifice can be placed at any point in a dashed box 168. The flow signal for actuating valve 118 could also be generated in other ways. For example, the differential pressure taken across the control valve in work circuit 104 to control the piston pump could also be used to actuate valve 118. Further, it would also be possible to sense the flow being applied to work circuit 104 using, for example, an electro-hydraulic flow sensor for generating an electrical signal representative of fluid flow, with the electrical signal being the flow signal.

Figure 3:
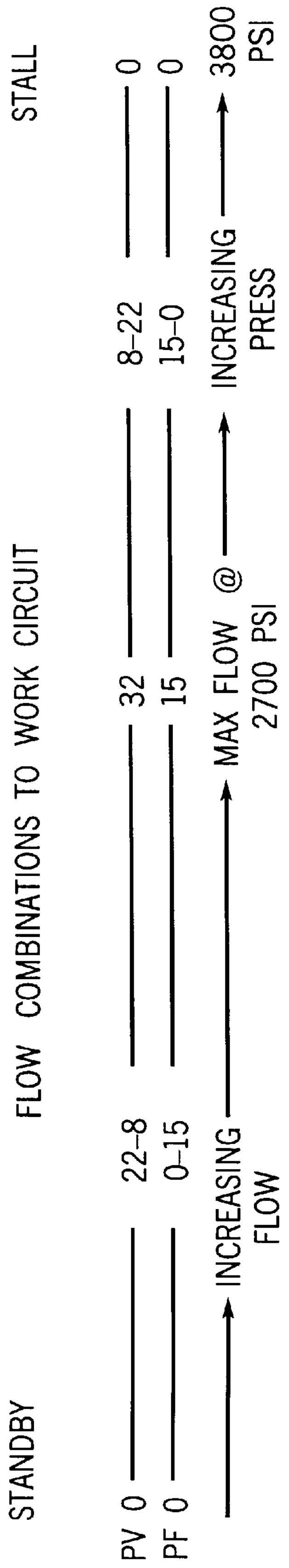
FIG. 3 is a graph showing combinations of fluid flow being applied to the work circuit shown in FIG. 1 by both the fixed displacement pump and the variable displacement pump of FIG. 1 at various flow and pressure conditions.
Figure 4:
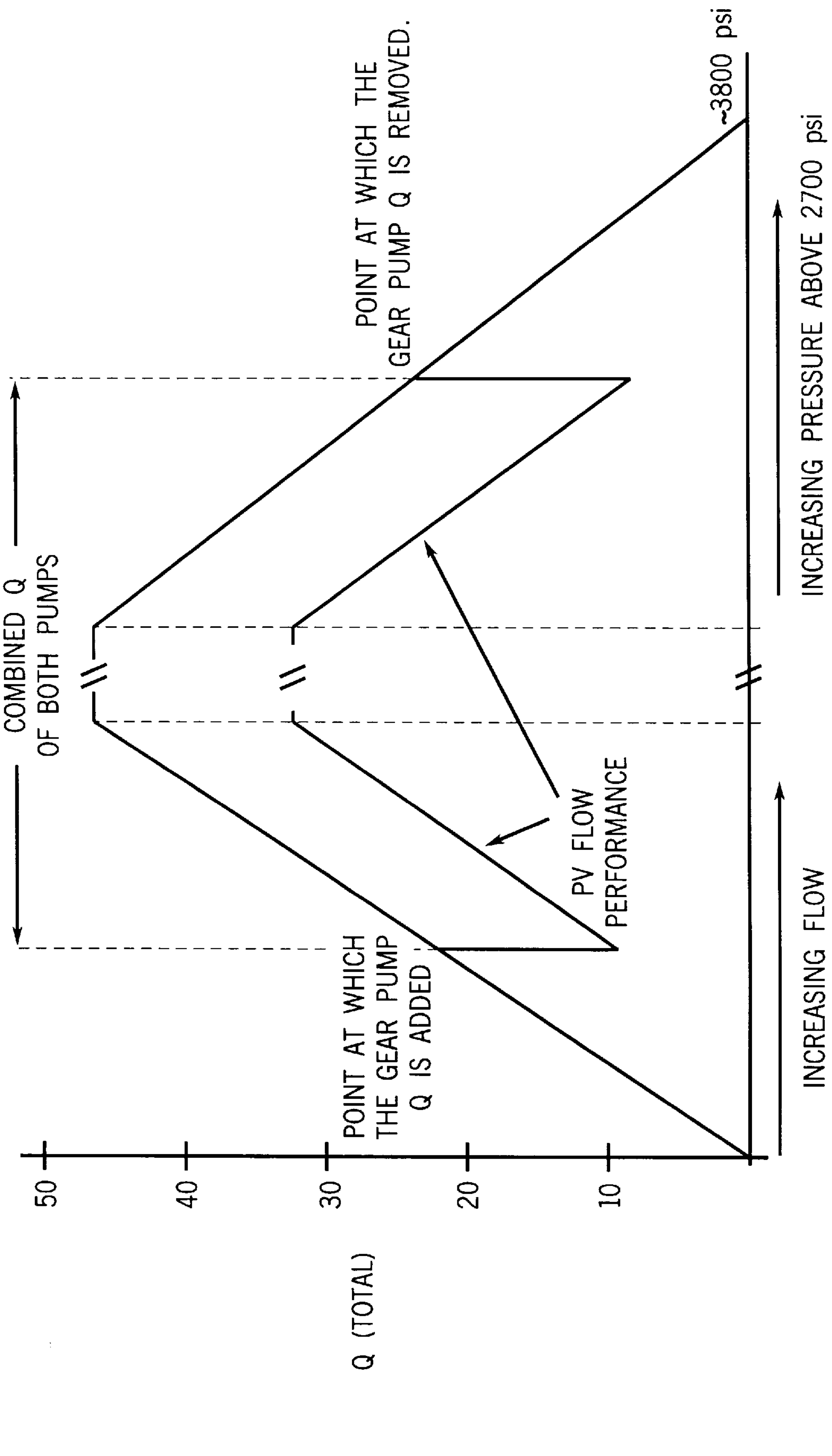
FIG. 4 is a graph showing the total flow being applied to the work circuit by both the fixed and variable displacement pumps at increasing flows and pressures, and also showing the contribution to total flow made by each pump.

The operation of hydraulic system 100 is further described in relation to FIGS. 3 and 4. FIG. 3 shows the fluid flow combinations applied to work circuit 104 by both pumps 114 and 116 at various flow and pressure conditions. The graph shows only the fluid being applied to work circuit 104, and does not show the fact that PF pump 114 is continuously pumping 15 gpm throughout all of the conditions.

Moving from left to right across FIG. 3, with the machine running in a stand-by condition (e.g., when work circuit 104 is not doing any useful work), PV pump 116 de-strokes and provides a near-zero output (i.e., no fluid being pumped). At stand-by, the differential pressure across restriction 160 is small, and valve 118 is biased as in FIG. 1. The flow does not drop to zero since the system maintains a certain amount of control pressure to feed the regulating valves which control the system. Thus, for example, if PV pump 116 is sized to provide a maximum flow of 32 gpm, PV pump 116 provides only on the order of 0.5 gpm when de-stroked.

Then, as work circuit 104 begins to demand increased flow under the influence of operator commands, PV pump 116 senses that the control pressure being maintained across the loader and backhoe control valves has changed using a series of built-in compensators, and responds by coming on-stroke to meet the increased demand (i.e., PV pump 116 senses a control pressure differential across the control valves, and attempts to maintain this differential by pumping more and more fluid up to its maximum flow). Thus, as the demand increases, PV pump 116 gradually increases its output to a flow of 22 gpm while the fixed flow from PF pump 114 continues to be bypassed around work circuit 104 by valve 118.

Then, as the demand reaches a predetermined flow between 22 and 23 gpm, the differential pressure across restriction 160 actuates unloading valve 118 to cause the fixed flow from PF pump 114 to also be applied to work circuit 104. To smooth the transition, and to avoid providing excess flow to circuit 104, the inherent flow compensation characteristics of PV pump 116 cause PV pump 116 to decrease its output flow to accommodate the redirected fixed flow. Thus, at a flow demand of 23 gpm, work circuit 104 receives the fixed flow (i.e., 15 gpm) from PF pump 114, as well as 8 gpm from PV pump 116. As the flow demand continues to increase to maximum system flow of 47 gpm, PV pump 116 increases its flow to its maximum of 32 gpm, and circuit 104 receives 47 gpm at a pressure of 2700 psi.

Then, as the pressures increase above 2700 psi, the compensator of PV pump 116 starts to allow oil to flow from the high-pressure circuit back to the de-stroking actuator (e.g., piston) on the pump to de-stroke the pump. This causes the flow from PV pump 116 to be reduced so that only the flow needed to maintain that pressure is provided. This occurs until PV pump 116 reduces its flow back to 8 gpm for a total system flow to circuit 104 of 23 gpm. As the pressures continue to increase, and the flow decreases to the predetermined flow between 22 and 23 gpm, the differential pressure across restriction 160 drops such that valve 118 snaps back to its initial state and the fixed flow is again bypassed around work circuit 104. PV pumps 116 senses the cut off of the fixed flow, and compensates by increasing its output flow. The inherent flow compensation characteristics of PV pump 116 again smooth the transition and avoid providing excess flow to circuit 104. Then, as the pressures continue to rise, pump 116 continues to de-stroke and provide less flow output until pump 116 becomes fully de-stroked at maximum pressure of 3800 psi.

Referring to FIG. 4, the total flow being applied to work circuit 104 by both PF pump 114 and PV pump 116 is shown at increasing flow and increasing pressure. Again, as the flow demand increases from zero, the total flow is provided by PV pump 116 until the point at which unloading valve 118 is actuated to redirect the fixed flow from PF pump 114 to work circuit 104. As shown by FIG. 4, all of the fixed flow (i.e., all 15 gpm) is applied at once, and no modulation occurs as PV pump 116 compensates for the redirected flow by decreasing its flow. As the flow demand continues to increase, the increase in flow is provided entirely by PV pump 116 until the maximum system flow of 47 gpm is reached. After the pressure rises above 2700 psi, PV pump 116 starts to de-stroke to decrease its flow until the point at which unloading valve 118 is de-actuated to direct all the fixed flow back to the return circuit. All of the fixed flow is bypassed from work circuit 104 at once, and no modulation occurs as PV pump 116 compensates for the bypassed flow by increasing its flow. PV pump 116 continues to de-stroke until the pressure reaches its maximum of 3800 psi, at which point PV pump 116 is completely de-stroked.

Thus, in a typical operation, the operator meters the control valve of the loader or backhoe for precise control or to accelerate the loader or the backhoe. Very precise operation (e.g., under 22 gpm) uses only flow provided by PV pump 116, taking advantage of its advantageous flow adjustment characteristics and high efficiency. At faster speeds (e.g., above 22 gpm), valve 118 diverts the 15 gpm fixed flow from PF pump 114) into the loader or backhoe operation, and PV pump 116 decreases flow to compensate. By using the flow compensation characteristics of PV pump 116, the transition from only-variable pump flow to combined pump flow is smooth and efficient. If the operator requests more speed, the flow can be increased to the combined maximum output of both pumps. If a resistive load is encountered forcing the loader or backhoe to slow down, PV pump 116 de-strokes to reduce its output (such that oil is not inefficiently forced over a relief valve) until the flow through restriction or orifice 160 is reduced to 22 gpm and unloading valve 118 bypasses the fixed flow from the loader or backhoe, and the flow compensating characteristics of PV pump 116 cause pump 116 to increase its flow to make up for the diverted fixed flow. As resistance increases, PV pump 116 de-strokes further to insure efficient operation. Then, at the higher pressures, the flow is provided only by PV pump 116, which is inherently better suited for high pressure operations.

Thus, hydraulic system 100 is an improved variable flow hydraulic system which overcomes a number of problems associated with prior art systems. The combination PV pump and PF pump is less expensive than a PV pump of an equivalent displacement, but performance is equivalent to that of a large size PV pump. Hydraulic system 100 is able to use smaller size PV pumps sold in higher quantities by their manufacturers, and at lower cost due to economies of scale. The total flow can easily be customized for other size machines simply by changing the displacement of the low-cost and highly customizable PF pump. By utilizing the inherent flow compensation characteristics of the PV pump, the fixed flow of the PF pump is smoothly added to or removed from the flow provided to the work circuit, without jerk or hesitation in machine performance. The unloading valve does not require modulation, and is free of inefficiencies caused by modulation. Metering at low flow or at high pressure is accomplished using only the PV pump, and only the required flow is supplied to make the operation accurate and efficient. Only the robust PV pump is exposed to higher pressures, which will prolong the life of the PF pump. The system provides continuous flow for filtration and cooling, which will cause the system to operate at cooler and cleaner average working conditions, with a positive impact for component life. The system directs all of the return oil (from both pumps) to the inlet port of the PV pump to provide a positive pressure charge at that inlet port to improve pump filling and reduce pump noise.

Another advantage of hydraulic system 100 is the improvement in controllability in fine metering situations. Fine metering operations typically occur either at low flows or high pressures. In hydraulic system 100, the fixed flow from PF pump 114 bypasses work circuit 104 in either of these situations, and only PV pump 116 provides flow to circuit 104. Thus, system 100 takes advantage of the favorable controllability attributes of the piston pump in these types of situations.

Hydraulic system 100 may also be provided with a pressure relief valve (not shown) having a relief setting adjusted higher than the normal working pressures (e.g., adjusted to about 4000 psi in the exemplary system). Such a relief valve will not affect the normal operation of hydraulic system 100 since, as system pressure increases, the flow from PF pump 114 will be cut out by unloading valve 118 such that the fixed flow need not be wastefully routed through a relief valve (as in prior art hydraulic systems), and PV pump 116 will de-stroke so that it produces only the flow which is needed to maintain the maximum pressure (e.g., 3800 psi).

Thus, hydraulic system 100 disclosed herein provides a hybrid dual pump hydraulic system which takes advantage of the positive attributes of both PV and PF pumps while providing the machine operator with a smooth and efficient system. Hydraulic system 100 provides these advantages by integrating the PV and PF pump output flows using the inherent flow compensation characteristics of the PV pump to produce smooth flow transitions which are transparent to the operator.

While the embodiments illustrated in the FIGS. and described above are presently preferred, it should be understood that these embodiments are offered by way of example only. The present invention is not intended to be limited to any particular embodiment, but is intended to extend to various modifications that nevertheless fall within the scope of the appended claims. For example, the flow signal applied to the unloading valve could be generated in any of several ways as described above, and the conduit system could be modified to exclude the priority steering cylinder, or to include or exclude other hydraulic fluid components which do not otherwise interfere with the operation of the variable flow hydraulic system disclosed herein. Other modifications will be evident to those with skill in the art.

What is claimed is:

1. A variable flow hydraulic system for supplying pressurized fluid in a machine, the machine having a power source for driving the hydraulic system and a work circuit having at least one fluid actuator for performing work in response to an applied hydraulic fluid flow, the hydraulic system comprising:

- a reservoir for storing hydraulic fluid for use in the work circuit;
- a fixed displacement pump having an inlet port and an outlet port, the fixed displacement pump configured to be driven by the power source to provide a fixed flow of pressurized hydraulic fluid;
- a variable displacement pump having an inlet port, an outlet port, a de-stroking actuator, and a compensator for controlling the de-stroking actuator, the variable displacement pump configured to be driven by the power source to provide a variable flow of pressurized hydraulic fluid to be applied to the work circuit; and
- a flow sensitive unloading valve having an inlet valve port fluidly coupled to the outlet port of the fixed displacement pump, a first outlet valve port fluidly coupled to the reservoir which bypasses the work circuit, and a second outlet valve port fluidly coupled to the work circuit, the unloading valve being configured to discretely direct the fixed flow entering the inlet valve port to one of the first and the second outlet valve ports depending upon a flow signal applied to the unloading valve, wherein the flow signal depends on the fluid flow applied to the work circuit.

2. The variable flow hydraulic system of claim 1, wherein the inlet port of the fixed displacement pump is fluidly coupled to the reservoir.

3. The variable flow hydraulic system of claim 2, wherein the outlet port of the fixed displacement pump is fluidly coupled to the inlet valve port by way of a priority fluid actuator so that the priority fluid actuator receives the fixed flow.

4. The variable flow hydraulic system of claim 1, wherein the variable displacement pump has output characteristics so that the variable displacement pump maintains a substantially full fluid flow until fluid pressure reaches a predetermined pressure, and then provides a gradual drop-off in fluid flow with increasing fluid pressures such that the fixed flow of pressurized hydraulic fluid provided by the fixed displacement pump can be unloaded from the work circuit during the drop-off.

5. The variable flow hydraulic system of claim 4, wherein the gradual drop-off in fluid flow with increasing fluid pressures above the predetermined pressure is determined by the configuration of the compensator.

6. The variable flow hydraulic system of claim 1, wherein the flow signal is a differential pressure signal representative of the fluid flow applied to the work circuit, and the flow sensitive unloading valve directs the fixed flow to one of the first and the second outlet valve ports depending upon the relationship between the differential pressure signal and a predetermined differential pressure value.

7. The variable flow hydraulic system of claim 6, wherein the flow sensitive unloading valve is biased to direct the fixed flow to the first outlet valve port when the differential pressure signal is below the predetermined differential pressure value, and wherein the bias of the unloading valve is overcome when the differential pressure signal exceeds the predetermined differential pressure value.

8. The variable flow hydraulic system of claim 1, further comprising a filter for filtering the combined fluid flow provided by the fixed and the variable displacement pumps as the combined fluid flow is being returned to the reservoir.

9. The variable flow hydraulic system of claim 8, further comprising a cooler for cooling the combined fluid flow as the combined fluid flow is being returned to the reservoir.

10. The variable flow hydraulic system of claim 1, wherein the combined fluid flow provided by the fixed and the variable displacement pumps passes by the inlet port of the variable displacement pump to provide a positive pressure charge at the inlet port of the variable displacement pump.

11. A variable flow hydraulic system for supplying pressurized fluid in a machine, the machine having a power source for driving the hydraulic system and a work circuit having at least one fluid actuator for performing work in response to an applied hydraulic fluid flow, the hydraulic system comprising:

- a reservoir for storing hydraulic fluid for use in the work circuit;
- a fixed displacement pump having an inlet port and an outlet port, the fixed displacement pump configured to be driven by the power source for providing a fixed flow of pressurized hydraulic fluid;
- a variable displacement pump having an inlet port, an outlet port, a de-stroking actuator, and a compensator for controlling the de-stroking actuator, the variable displacement pump configured to be driven by the power source to provide a variable flow of pressurized hydraulic fluid to be applied to the work circuit;
- a flow sensitive unloading valve having an inlet valve port, a first outlet valve port, and a second outlet valve port, the unloading valve configured to discretely switch fluid flow entering the inlet valve port between the first and the second outlet valve ports based on a fluid signal applied to the unloading valve; and a conduit system for distributing fluid flow between the reservoir, the fixed and the variable displacement pumps, the flow sensitive unloading valve, and the work circuit, wherein the outlet port of the fixed displacement pump is fluidly coupled to the inlet valve port, the first outlet valve port bypasses the work circuit, the second outlet valve port is fluidly coupled to the work circuit, and the outlet port of the variable displacement pump is also fluidly coupled to the work circuit;

wherein the conduit system has a restriction for generating the fluid signal applied to the unloading valve in response to the fluid flow applied to the work circuit to discretely switch the fixed fluid flow from the fixed displacement pump between being applied to the work circuit and bypassing the work circuit.

12. The variable flow hydraulic system of claim 11, wherein the inlet port of the fixed displacement pump is fluidly coupled to the reservoir and the outlet port of the fixed displacement pump is fluidly coupled to the inlet valve port by way of a priority fluid actuator so that the priority fluid actuator receives the fixed flow.

13. The variable flow hydraulic system of claim 11, wherein the variable displacement pump has output characteristics so that the variable displacement pump maintains a substantially full fluid flow until fluid pressure reaches a predetermined pressure, and then provides a gradual drop-off in fluid flow with increasing fluid pressures such that the fixed flow of pressurized hydraulic fluid provided by the fixed displacement pump can be unloaded from the work circuit during the drop-off, wherein the gradual drop-off is determined by the configuration of the compensator.

14. The variable flow hydraulic system of claim 11, wherein the restriction comprises an orifice located in the conduit system between the variable displacement pump and work circuit, and the fluid signal is a differential pressure signal taken across the orifice.

15. The variable flow hydraulic system of claim 14, wherein the flow sensitive unloading valve directs the fixed flow to the first outlet valve port when the differential pressure signal taken across the orifice is below a predetermined differential pressure value, and directs the fixed flow to the second outlet valve port when the differential pressure exceeds the predetermined differential pressure value.

16. The variable flow hydraulic system of claim 11, further comprising a filter for filtering the combined fluid flow provided by the fixed and the variable displacement pumps as the combined fluid flow is being returned to the reservoir.

17. The variable flow hydraulic system of claim 16, further comprising a cooler for cooling the combined fluid flow as the combined fluid flow is being returned to the reservoir.

18. The variable flow hydraulic system of claim 11, wherein the combined fluid flow provided by the fixed and the variable displacement pumps passes by the inlet port of the variable displacement pump to provide a positive pressure charge at the inlet port of the variable displacement pump.

19. A method of applying a variable flow of pressurized hydraulic fluid to a work circuit in a machine, the work circuit having at least one fluid actuator for performing work in response to the applied fluid flow, the method comprising:

pumping a fixed fluid flow using a fixed displacement pump;

pumping a variable fluid flow using a variable displacement pump;

applying the variable fluid flow pumped by the variable displacement pump to the work circuit;

generating a flow signal based upon the fluid flow being applied to the work circuit, the flow signal representative of first and second flow states; and bypassing the fixed fluid flow pumped by the fixed displacement pump around the work circuit when the flow signal is in the first state and directing the fixed fluid flow to the work circuit when the flow signal is in the second state.

20. The method of claim 19, further comprising the step of pumping the fixed fluid flow to a priority fluid actuator regardless of whether the fixed fluid flow bypasses the work circuit or is directed to the work circuit.

21. The method of claim 19, wherein the step of generating the flow signal comprises determining a differential pressure which occurs when the fluid flow being applied to the work circuit passes through a restriction.

* * * * *